United States Patent
Levy et al.

(10) Patent No.: US 11,171,882 B2
(45) Date of Patent: Nov. 9, 2021

(54) FLEXIBLE CLOS TOPOLOGY SWITCH

(71) Applicant: MELLANOX TECHNOLOGIES TLV LTD., Raanana (IL)

(72) Inventors: Gil Levy, Hod Hasharon (IL); Barak Gafni, Campbell, CA (US)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 128 days.

(21) Appl. No.: 16/816,308

(22) Filed: Mar. 12, 2020

(65) Prior Publication Data
US 2021/0288921 A1    Sep. 16, 2021

(51) Int. Cl.
*H04L 12/933* (2013.01)

(52) U.S. Cl.
CPC .............................. *H04L 49/1515* (2013.01)

(58) Field of Classification Search
CPC . H04L 49/15; H04L 49/1507; H04L 49/1515; H04L 49/1523
See application file for complete search history.

(56) References Cited

U.S. PATENT DOCUMENTS

| | | | |
|---|---|---|---|
| 8,570,865 B2 | 10/2013 | Goldenberg et al. | |
| 8,576,715 B2 | 11/2013 | Bloch et al. | |
| 9,014,006 B2 | 4/2015 | Haramaty et al. | |
| 9,137,143 B2 | 9/2015 | Parker et al. | |
| 9,544,185 B1 * | 1/2017 | Yadav | H04L 41/0668 |
| 9,571,421 B1 * | 2/2017 | Brar | H04L 49/1515 |
| 9,634,940 B2 | 4/2017 | Haramaty et al. | |
| 2015/0124631 A1 * | 5/2015 | Edsall | H04W 28/0231 370/252 |
| 2015/0124817 A1 * | 5/2015 | Merchant | H04L 61/103 370/392 |
| 2015/0127797 A1 * | 5/2015 | Attar | H04L 45/38 709/223 |
| 2017/0054445 A1 | 2/2017 | Wang | |
| 2017/0181315 A1 * | 6/2017 | Gafni | H04L 49/15 |
| 2017/0187629 A1 * | 6/2017 | Shalev | H04L 61/2007 |
| 2019/0253345 A1 * | 8/2019 | Levy | H04L 49/254 |
| 2020/0313956 A1 * | 10/2020 | Heitz | H04L 45/04 |

OTHER PUBLICATIONS

Leiserson et al., "Fat-Trees: Universal Networks for Hardware Efficient Supercomputing", IEEE Transactions on Computers, vol. C-34, No. 10, pp. 892-901, Oct. 1985.

* cited by examiner

*Primary Examiner* — Kevin D Mew
(74) *Attorney, Agent, or Firm* — Kligler & Associates Patent Attorneys Ltd

(57) ABSTRACT

In one embodiment, a computer network system, includes at least one lower tier of lower switches, at least one upper tier of upper switches, and a middle tier of middle switches connected down-tier to ones of the lower switches and up-tier to ones of the upper switches, one of the middle switches including a clos topology arrangement of leaf and spine switches, the leaf switches being connected via K internal network connections to the spine switches, each leaf switch being connected to each spine switch, the leaf switches being connected via N down-tier network connections to ones of the lower switches and via M up-tier network connections to ones of the upper switches, there being more of the N down-tier network connections than there are of the M up-tier network connections, and there being less of the K internal network connections than there are of the N and M connections.

20 Claims, 2 Drawing Sheets

FLEXIBLE CLOS TOPOLOGY SWITCH

FIELD OF THE INVENTION

The present invention relates to network devices, and in particular, but not exclusively to, Clos topology switches.

BACKGROUND

A challenge in modern network technology is to implement a switch with a high port count or radix. A common way to scale switch bandwidth and radix is to connect multiple switches, for example in a Clos topology. In such a Clos topology switch, leaf switches connect with the network ports while spine switches interconnect with the leaf switches.

For example, US Patent Publication 2017/0054445 of Wang et al., describes an integrated circuit comprising a plurality of switch matrices wherein the plurality of switch matrices are arranged in stages including (i) a first stage, configured in a hierarchical network (for example, a radix-4 network), (ii) a second stage configured in a hierarchical network (for example, a radix-2 or radix-3 network) and coupled to switches of the first stage, and (iii) a third stage configured in a mesh network and coupled to switches of the first or second stages or both of them.

US Patent Publication 2019/0253345 of Levy, et al., describes a network box connected in a communication network, including a first tier of leaf switches having ingress ports and egress ports, configured to exchange packets, a second tier of spine switches having ingress ports and egress ports, and configured to exchange the packets with the first tier, and first packet processing circuitry, configured to adaptively route the packets from the first tier to the second tier, and second packet processing circuitry configured to statically route the packets from the second tier to the first tier.

SUMMARY

There is provided in accordance with an embodiment of the present disclosure, a computer network system, including at least one lower tier of lower switches, ones of the lower switches being connected to lower end point devices, at least one upper tier of upper switches, and a middle tier of middle switches connected down-tier to ones of the lower switches and up-tier to ones of the upper switches, one of the middle switches including a clos topology arrangement of leaf switches and spine switches, wherein the leaf switches are connected via K internal network connections to the spine switches, each of the leaf switches being connected to each of the spine switches, the leaf switches are connected via N down-tier network connections to ones of the lower switches and via M up-tier network connections to ones of the upper switches, there are more of the N down-tier network connections than there are of the M up-tier network connections, and there are less of the K internal network connections between the leaf switches and the spine switches than there are of the N network connection plus the M network connections.

Further in accordance with an embodiment of the present disclosure the at least one lower tier includes a plurality of pods, each pod including at least one of the lower switches, respective different groups of the pods being connected via respective groups of the N down-tier network connections to respective ones of the leaf switches.

Still further in accordance with an embodiment of the present disclosure a first one of the leaf switches includes only Q network connections, less than half of the Q network connections being connected to the spine switches, more than half of the Q network connections being connected to different ones of the pods selected from a first one of the groups of the pods.

Additionally in accordance with an embodiment of the present disclosure a second one of the leaf switches includes only R network connections, less than half of the R network connections being connected to the spine switches, more than half of the R network connections being connected to different ones of the pods selected from a second one of the groups of the pods.

Moreover, in accordance with an embodiment of the present disclosure a first one of the leaf switches including only Q network connections, less than 25% of the Q network connections being connected to spine switches, more than 75% of the Q network connections being connected to different ones of the pods.

Further in accordance with an embodiment of the present disclosure the pods include two layers of the lower switches, a bottom layer of the lower switches being connected to the lower endpoint device, a top layer of the lower switches connected to the bottom layer and to ones of the middle switches.

Still further in accordance with an embodiment of the present disclosure the pods are disposed in a data center.

Additionally, in accordance with an embodiment of the present disclosure at least one of the leaf switches is connected via P respective ones of the M up-tier network connections to P respective one of the upper switches and via P respective ones of the K internal connections to the spine switches.

Moreover, in accordance with an embodiment of the present disclosure the one middle switch includes an enclosure box including external network port connections, the leaf and spine switches are disposed in the enclosure box, and the K internal network connections are disposed in the enclosure box.

Further in accordance with an embodiment of the present disclosure a quantity of the leaf switches is more than double a quantity of the spine switches.

There is also provided in accordance with another embodiment of the present disclosure, a network switch device, including an enclosure box, external network port connections disposed on the enclosure box, and configured to receive network cables from devices external to the network switch, and a clos topology arrangement of respective leaf switches and respective spine switches disposed in the enclosure box, wherein the leaf switches are connected via K internal network connections to the spine switches, the K internal network connections are disposed in the enclosure box, each of the leaf switches is connected via at least one of the K internal network connections to each of the spine switches, and there are less of the K internal network connections between the leaf switches and the spine switches than there are of the external network port connections.

Still further in accordance with an embodiment of the present disclosure one of the leaf switches includes only R network connections, less than half of the R network connections being connected to the spine switches via ones of the K internal network connections, more than half of the R network connections being connected to the external network port connections.

Additionally, in accordance with an embodiment of the present disclosure one of the leaf switches includes only R network connections, less than 25% of the R network connections being connected to the spine switches via ones of the K internal network connections, more than 75% of the R network connections being connected to the external network port connections.

Moreover, in accordance with an embodiment of the present disclosure a quantity of the leaf switches is more than double a quantity of the spine switches.

There is also provided in accordance with still another embodiment of the present disclosure, a network switch device, including a clos topology arrangement of leaf switches and spine switches, and K internal network connections connecting the leaf switches to the spine switches, each of the leaf switches being connected to each of the spine switches, wherein the leaf switches are connected via N down-tier network connections to lower switches in at least one lower tier, which is connected to lower end point devices, and via M up-tier network connections to ones of the upper switches in at least one upper tier, there are more of the N down-tier network connections than there are of the M up-tier network connections, and there are less of the K internal network connections between the leaf switches and the spine switches than there are of the N network connection plus the M network connections.

Further in accordance with an embodiment of the present disclosure the at least one lower tier includes a plurality of pods, each pod including at least one of the lower switches, respective different groups of the pods being connected via respective groups of the N down-tier network connections to respective ones of the leaf switches.

Still further in accordance with an embodiment of the present disclosure a first one of the leaf switches includes only Q network connections, less than half of the Q network connections being connected to the spine switches, more than half of the Q network connections being connected to different ones of the pods selected from a first one of the groups of the pods.

Additionally, in accordance with an embodiment of the present disclosure a second one of the leaf switches includes only R network connections, less than half of the R network connections being connected to the spine switches, more than half of the R network connections being connected to different ones of the pods selected from a second one of the groups of the pods.

Moreover, in accordance with an embodiment of the present disclosure a first one of the leaf switches including only Q network connections, less than 25% of the Q network connections being connected to spine switches, more than 75% of the Q network connections being connected to different ones of the pods.

Further in accordance with an embodiment of the present disclosure a quantity of the leaf switches is more than double a quantity of the spine switches.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
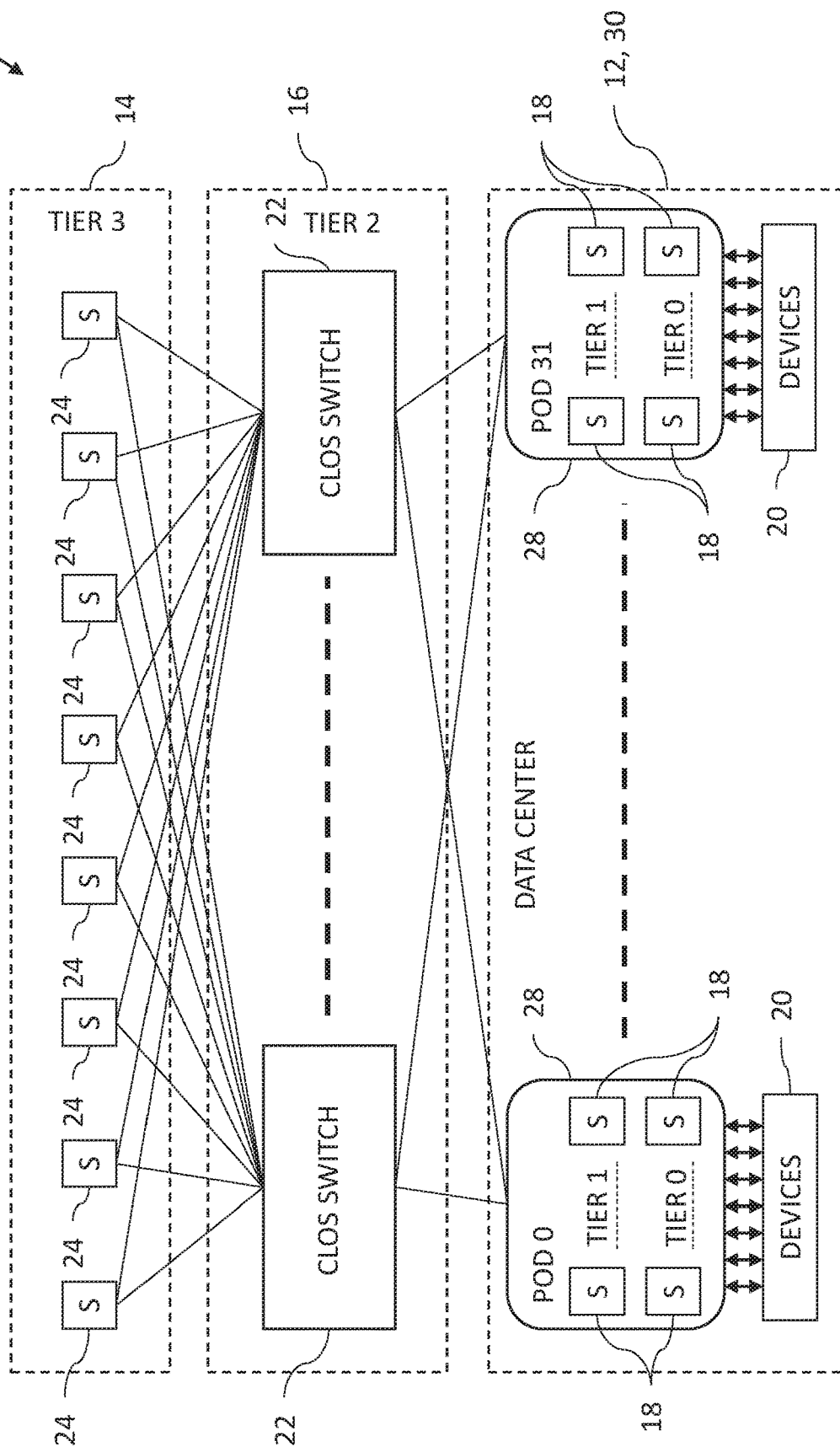
FIG. 1 is a block diagram view of a computer network system constructed and operative in accordance with an embodiment of the present invention.

One way to scale switch bandwidth and radix is to connect multiple switches in a Clos topology, with leaf switches facing the network ports and spine switches being used to connect between the leaf switches. Each leaf switch is connected to each spine switch. The Clos topology arrangement of switches (also referred to as a "box", although housing the leaf and spine switches in an enclosure or rack is not essential) behaves like a single switch with a large radix to the rest of the network outside of the box. The traffic entering the box generally enters via one of the leaf switches and is forwarded to one of the spine switches and is then forwarded out of the box via another one of the leaf switches. The network port connections are on the leaf level, and spine switches do not have any direct ports outside of the box. The Clos topology creates an internal network in the box using different switch application-specific integrated circuits (ASICs) or dies. The box may be particularly useful as a building block when building large networks.

For a non-blocking box, where any pair of ports can communicate at the same time without any congestion, half of the ports of each leaf switch are connected to the spine switches leaving half of the leaf switch ports for connection to the network outside the box. Therefore, in general, if it is desired to double the radix of a single switch, from say 32 to 64, the box will include 6 switches of 32 radix each, comprising 4 leaf switches and 2 spine switches. By way of another example, if every leaf and spine switch has a radix of 32, and it is desired to create a box with 256 ports to the network, the box may include 16 leaf switches and 8 spine switches, giving a total of 24 switches. Creating such a box may be expensive, use a large amount of space, as well as being resource intensive due to issues such as power usage and heat management.

Embodiments of the present invention, include a compact Clos topology switch device including leaf switches and spine switches where the number of external port connections is greater than the number of internal connections between the leaf switches and spine switches. Therefore, if each of the leaf and spine switches has the same radix, then the ratio of leaf switches to spine switches is greater than two, thereby reducing the cost, size and resource overhead of the box.

The compact Clos topology switch device provides a non-blocking box by forwarding a majority of traffic at the leaf level, while only a minority of the traffic needs to be forwarded at the spine level, as will be described in more detail below. Therefore, in such situations the connections between the leaf switches and the spine switches may be reduced, thereby leaving more connections open to the external network from the leaf switches, as well as requiring less spine switches. In one example, described with reference to disclosed embodiments, the box includes 256 ports to the network with 12 leaf switches and 3 spine switches, giving a total of 15 switches, which represents a significant improvement over the box of 24 switches described in the previous example above.

The box may be used in a variety of network situations (e.g., in upper tiers of Clos networks), where the box may forward north-south traffic between a lower tier and an upper tier (for example, from an end point device in one data center to an end point in another data center via the upper tier), and may forward east-west traffic (for example, for an end point device of one pod in one data center to another end point device of another pod in the same data center). In many cases, the north-south traffic may be oversubscribed, as there may be more east-west traffic than the north-south traffic for the box to forward. Therefore, in embodiments of the present invention, the network port connections from the box are connected so that connections to down-tier traffic (e.g., to lower tier(s)) are grouped together (which generally leads to connections to up-tier traffic (e.g., to higher tier(s)) being grouped together). In particular, one or more leaf switches may be used to provide connections to the up-tier traffic, while one or more leaf switches may be used to provide connections to the down-tier traffic. In this way, most east-west traffic may be forwarded at the leaf level and not the spine level, thereby leading to the use of less spine switches as described above. The terms "up-tier" and "down-tier", as used in the specification and claims, are defined relative to the placement of the "box" in the network, so that "up-tier" is a connection/traffic to and from a tier above the tier in which the box is located in, and "down-tier" is a connection/traffic to and from a tier below the tier in which the box is located in.

In some embodiments, the leaf switches which are connected to the down-tier traffic are connected so that each leaf switch is connected to a variety of different down-tier pods to increase the probability that the leaf switch forwards the east-west traffic without having to use one of the spine switches. In some embodiments, different combinations of down-tier pods are connected to different leaf switches to increase the probability that one of the leaf switches forwards the east-west traffic without having to use one of the spine switches.

System Description

Reference is now made to FIG. 1, which is a block diagram view of a computer network system 10 constructed and operative in accordance with an embodiment of the present invention. The computer network system 10 includes multiple layers including at least one lower tier 12 (e.g., tiers 0 and 1), at least one upper tier 14 (e.g., tier 3), and a middle tier 16 (e.g., tier 2).

In the example of FIG. 1, the lower tiers 12 includes any suitable number of switches 18 in two tiers, e.g., tier 0 and tier 1. The switches 18 in tier 0 are connected to any suitable number of end point devices 20 and to the switches 18 in tier 1. The switches 18 in the lower tier(s) 12 may be referred to as "lower switches" as they are disposed in the lower tier(s) 12. The switches 18 in tier 0 may be connected to the switches 18 in tier 1 via any suitable network topology, for example, but not limited to, a Clos topology. The switches 18 may include any suitable switch device, for example, but not limited to, a single application-specific integrated circuit (ASIC) switch device.

The upper tier(s) 14 includes any suitable number of switches 24. The switches 24 in the upper tier(s) 14 may be referred to as "upper switches" as they as disposed in the upper tier(s) 14. The switches 24 may be arranged in any suitable network topology, for example, in one or more layers. The switches 24 may include any suitable switch device, for example, but not limited to, a single ASIC switch device. At least some of the switches 24 may be connected to other data centers, for example.

The middle tier 16 includes any suitable number of compact Clos topology switches 22. The switches 22 in the middle tier 16 may be referred to as "middle switches" as they are disposed in the middle tier 16. It should be noted that the term "middle tier" is used to describe a tier between two other tiers and in some embodiments may not be disposed exactly in the middle layer of the multiple layers. Only two switches 22 have been shown for the sake of simplicity. The switches 22 may include any suitable switch device, for example, but not limited, a high radix box, including switches arranged in a Clos topology described in more detail with reference to FIG. 2. The switches 22 are connected down-tier to the switches 18 in tier 1, and up-tier to at least some of the switches 24 in the upper tier(s) 14 (tier 3). The switches 22 may be connected to the switches 18 and the switches 24 in a suitable network topology, for example, but not limited to, a Clos topology.

In some embodiments, the lower tier(s) 12 includes a plurality of pods 28. Each pod 28 includes a group of the switches 18 and a group of the end point devices 20 (e.g., servers and/or machines). Each pod 28 may represent a physical arrangement of the switches 18 and the respective end point devices 20, for example, the switches 18 and the end point devices 20 in a rack or a group of racks or in a given physical location. Each pod 28 may include two layers of switches 18, e.g., one or more switches 18 in tier 0 and one or more switches 18 in tier 1, with the switches 18 in tier 0 being connected to the end point devices 20 of that pod 28 and to the switches 18 in tier 1, and the switches 18 in tier 1 being connected to the switches 22 in the middle tier 16. In some embodiments, each of the pods 28 may be connected (via one or more the switches 18) to each of the switches 22 in the middle tier 16, for example, using a Clos topology. The pods 28 in the lower tier(s) 12 may be disposed in a data center 30 or any other suitable location or arrangement.

Traffic from one of the end point devices 20 to another one of the end point devices 20 in the same pod 28 may be forwarded by one or more of the switches 18 in tier 0 and optionally tier 1. Traffic from one of the end point devices 20 in one pod 28 to another end point device 20 in another pod 28 may be forwarded by one of the switches 22 in the middle tier 16. In such a case, that switch 22 in the middle tier 16 is said to be forwarding east-west traffic.

Traffic from one of the end point devices 20 in the lower tier(s) 12 to a remote end point device (e.g., in a remote data center or a different city or country) via the upper tier 14, may be forwarded by some switches 18 in the pod 28 of that end point device 20, one of the switches 22 in the middle tier 16, and one or more of the switches 24 in the upper tier 14. In such a case, the switch 22 in the middle tier 16 is said to be forwarding north-south traffic.

In computer network system 10, the aggregated uplink bandwidth and the downlink bandwidth of a tier are not necessarily equal and in many cases the uplink bandwidth is much lower than the downlink bandwidth. For example, each switch 22 in the middle tier 16 may forward much more east-west traffic than north-south traffic. The networks and/or tiers may then be denoted as oversubscribed and the oversubscription ratio is determined by the downlink bandwidth divided by the uplink bandwidth of the tier switch, e.g., one of the switches 22.

Figure 2:
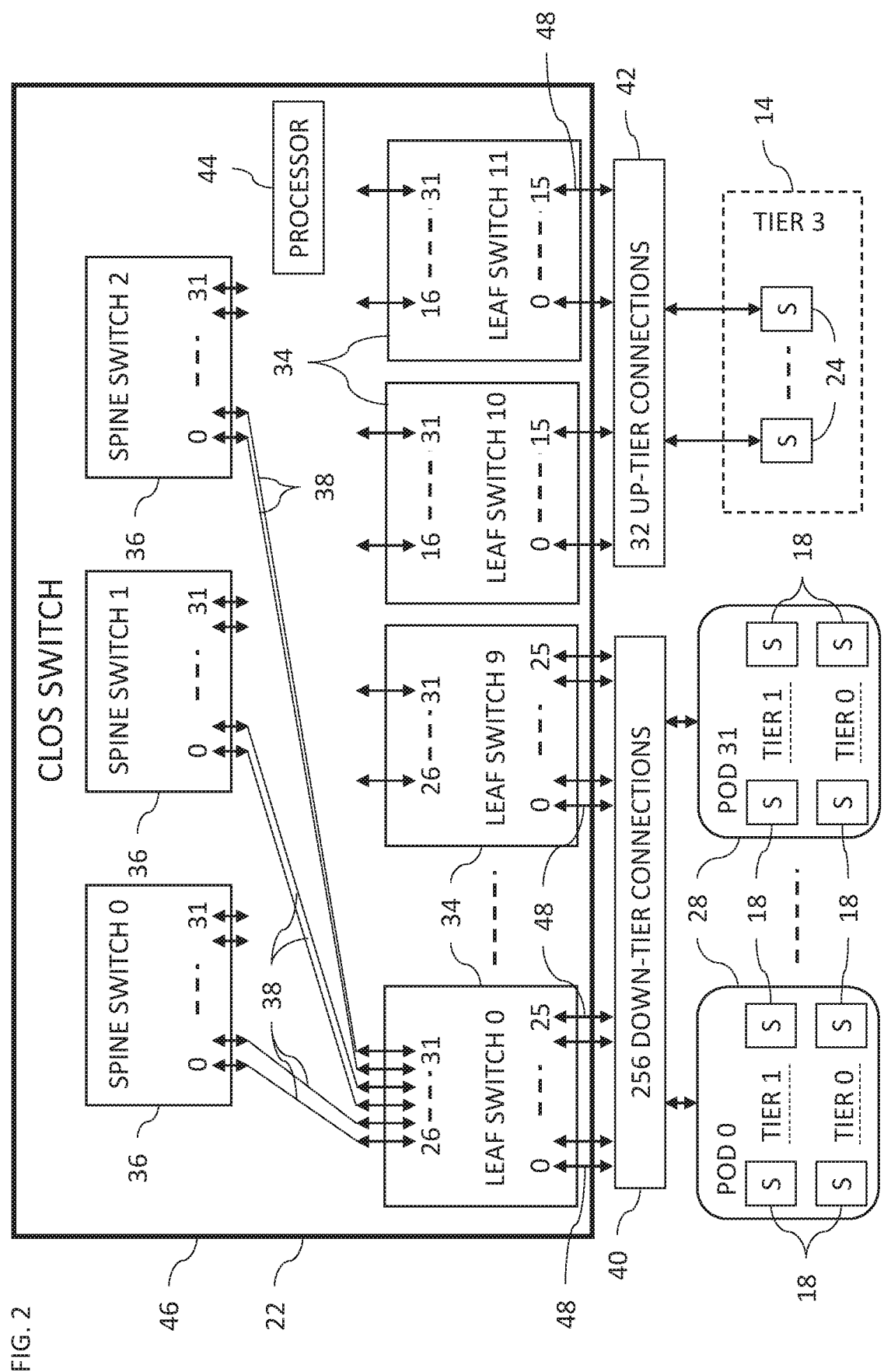
FIG. 2 is a block diagram view of a compact Clos switch for use in the system of FIG. 1 constructed and operative in accordance with an embodiment of the present invention.

Reference is now made to FIG. 2, which is a block diagram view of one of the compact Clos topology switches 22 for use in the system 10 of FIG. 1 constructed and operative in accordance with an embodiment of the present invention.

The switch 22 shown in FIG. 2 includes a Clos topology arrangement of leaf switches 34 and spine switches 36. In the example of FIG. 2 the switch 22 includes twelve leaf switches 34 and three spine switches 36. However, the switch 22 may include any suitable number of leaf switches 34 and spine switches 36 with the number of spine switches 36 generally being less than half of the number of the leaf switches 34 as described in more detail below. The leaf switches 34 are connected via internal network connections 38 to the spine switches 36. Each of the leaf switches 34 is connected to each of the spine switches 36 (by one or more of the internal network connections 38). Only some of the internal network connections 38 are shown in FIG. 2 for the sake of simplicity. The leaf switches 34 are connected via down-tier network connections 40 to the switches 18 in tier 1 and via up-tier network connections 42 to at least some of the switches 24 in the upper tier 14 (tier 3). The network port connections defined by the leaf switches 34 are divided among the down-tier network connections 40 and the up-tier network connections 42 according to the down-tier and up-tier traffic bandwidth requirements, which are described in more detail below.

As previously mentioned, in a clos topology switch, the traffic arriving at one of the leaf switches may be forwarded to one of the spine switches and then forwarded to one of the leaf switches. In such a way, the clos topology switch provides forwarding of east-west traffic and north-south traffic via the leaf and spine switches. As mentioned above, to double the radix of a single switch generally needs six switches connected in a Clos topology "box" to provide the double radix connections to the network based on a clos topology where all traffic is assumed to be forwarded at the spine layer of the box.

However, in the computer network system 10 (FIG. 1) it is generally assumed that the down-tier bandwidth requirements are higher than the up-tier bandwidth requirements (i.e., north-south traffic is oversubscribed). In other words, there is much more east-west traffic forwarding than there is north-south traffic forwarding by the switch 22. Therefore, the switch 22 provides a box where not all the traffic is forwarded by the spine switches 36, and in a majority of cases the traffic is forwarded by one of the leaf switches 34 without needing one of the spine switches 36 to forward traffic. This may be achieved by careful connection of the leaf switches 34 to the pods 28 via the down-tier network connections 40 as described in more detail below.

For example, POD 0 and POD 31 may be connected via respective down-tier network connections 40 to LEAF SWITCH 0. East-west traffic from POD 0 to POD 31 may be forwarded by LEAF SWITCH 0 without LEAF SWITCH 0 having to forward the traffic via any of the spine switches 36. Similarly, the other pods 28 may be suitably connected to leaf switches 34 to allow forwarding by the respective leaf switches 34 of east-west traffic without needing to use any of the spine switches 36 to forward traffic. For example, different groups of different pods 28 may be connected to different leaf switches 34 thereby facilitating forwarding east-west traffic using leaf switches 34 without always needing the spine switches 36 to forward traffic between the pods 28. The spine switches 36 are then mainly used for forwarding north-south traffic, for example, between the pods 28 and the upper tier 14. For example, traffic from POD 0 may be forwarded to LEAF SWITCH 0 which forwards to SPINE SWITCH 1, which in turn forwards the traffic to LEAF SWITCH 10, which forwards the traffic via one or more of the up-tier network connections 42 to one or more of the switches 24, etc. If traffic is forwarded between two pods 28 (e.g., POD X and POD Y) via one of the leaf switches 34, and POD X and POD Y are not directly connected to that leaf switch 34, the traffic is still forwarded via one of the spine switches 36.

Therefore, in the above scenario, spine switches 36 are not needed to forward all the east-west traffic thereby allowing the number of the internal network connections 38 between the leaf switches 34 and the spine switches 36 to be reduced, and therefore allowing more of the network connections of the leaf switches 34 to be used for external network port connections. Another assumption used in the construction of the switch 22 is that the number of pods 28 to be connected to the switch 22 is in the order of a single switch radix, e.g., the radix of one of the leaf switches 34. For example, the number of pods 28 is less than twice the single switch radix. This assumption may hold for small and medium sized data centers.

Therefore, the above configuration of switch 22 assumes that there are more of the down-tier network connections 40 than there are of the up-tier network connections 42. Also, there are less internal network connections 38 between the leaf switches 34 and the spine switches 36 than there are of the network connections 40 plus the network connections 42.

The switch 22 is connected so that respective different groups of the pods 28 are connected via respective groups of the down-tier network connections 40 to respective ones of the leaf switches 34. For example, one group of different pods 28 may be connected via some of the down-tier network connections 40 to one of the leaf switches 34, and another different group of different pods 28 may be connected via some of the down-tier network connections 40 to another one of the leaf switches 34 and so on. It should be noted that although the different groups of the pods 28 have an overall different population of the pods 28, at least some group may include pods 28 common to another group. For example, one group may include PODS 1-26 connected to LEAF SWITCH 0, and another group may include PODS 3-28 connected to LEAF SWITCH 1, and so on.

In some embodiments, one leaf switch 34 may include only Q network connections with less than half of the Q network connections being connected to the spine switches 36, and more than half of the Q network connections being connected to different pods 28 selected from one group of the pods 28 (e.g., via external network port connections 48). Similarly, another leaf switches 34 may include only R network connections with less than half of the R network connections being connected to the spine switches 36, and more than half of the R network connections being connected to different pods 28 selected from another group of the pods 28 (e.g., via external network port connections 48), and so on. The terms "include only Q" or "include only R" are defined to mean that the leaf switch has a radix of no more than Q or R, respectively.

In some embodiments, one of the leaf switches 34 may include only Q network connections with less than 25% of the Q network connections being connected to spine switches 36, and more than 75% of the Q network connections being connected to different pods 28 (e.g., via external network port connections 48), and so on for additional leaf switches 34 which may be connected to different groups of pods 28 and the spine switches 36 in the above proportions.

One or more of the leaf switches 34 may be used for connections to the up-tier network connections 42. In the example of FIG. 2, LEAF SWITCH 10 and 11 are connected to the up-tier network connections 42. In some embodiments, at least one of the leaf switches 34 is connected via P up-tier network connections 42 to switches 24 (e.g., P switches 24) and via P internal network connections 38 to the spine switches 36.

In some embodiments, a quantity of the leaf switches 34 is more than double a quantity of the spine switches 36, for example, when each leaf switch 34 and each spine switch 36 has the same radix.

The spine switches 36 may be "dumb" switches which perform packet forwarding according to forwarding tables without classifying packets. In some embodiments, the spine switches 36 may be "smart" switches which both classify and forward packets according to tables. The leaf switches 34 are generally "smart" switches, but in some embodiments may be "dumb" switches. Each switch 34, 36 typically includes an ASIC configured to forward packets according to forwarding tables and perform other functions, such as classification.

The switch 22 may include one or more processors 44. In some embodiments, one processor 44 manages the leaf switches 34, 36. In other embodiments, each leaf switch 34, 36 is managed by its own processor 44. The processor(s) 44 manages the control plane, configures switch(es) and forwarding tables, and maintains the networking protocol including building forwarding tables. In practice, some or all of the functions of the processors 44 may be combined in a single physical component or, alternatively, implemented using multiple physical components. These physical components may comprise hard-wired or programmable devices, or a combination of the two. In some embodiments, at least some of the functions of the processors 44 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

In some embodiments, the switch 22 includes an enclosure box 46 and the external network port connections 48 (only some being shown for the sake of simplicity, and of those shown only some being labeled for the sake of simplicity) disposed on the enclosure box 46. The external network port connections 48 are configured to receive network cables (not shown) from devices external to the network switch 22, for example, the pods 28 and the switches 24 in tier 3 (the upper tier 14). The leaf switches 34 and spine switches 36 are disposed in the enclosure box 46. The leaf switches 34 are connected via the internal network connections 38 to the spine switches 36. The internal network connections 38 are disposed in the enclosure box 46. There are less of the internal network connections 38 between the leaf switches 34 and the spine switches 36 than there are of the external network port connections 48.

In some embodiments, the leaf switches 34 and the spine switches 36 may be disposed in a rack connected by cables or a back-plane.

In the example of FIG. 2, each leaf switch 34 and spine switch 36 has a radix of 32, giving 32 available network connections per switch 34, 36. There are also thirty-two pods 28 with eight uplinks (e.g., eight of the down-tier network connections 40) from each of the pods 28 to each of the switches 22. It is assumed that the north-south oversubscription ratio is equal to ⅛. Based on the above, the number of down-tier network connections 40 may be computed as 32 pods multiplied by 8 uplinks per pod, giving 256 down-tier network connections 40 per switch 22 to the pods 28. As the north-south oversubscription is equal to ⅛, the number of up-tier network connections 42 per switch 22 may be set as ⅛ multiplied by 256 giving 32 up-tier network connections 42 per switch 22. To fulfill the above requirements, the switch 22 may be implemented with twelve leaf switches 34, ten for connecting with the down-tier network connections 40 and two for connecting with the up-tier network connections 42, and three spine switches 36, giving a total of fifteen switches 34, 36. Twenty-six of the network connections of each of the LEAF SWITCHES 0 to 9 may be used for connecting to the down-tier network connections 40, and six of the network connections of each of the LEAF SWITCHES 0 to 9 may be used for connecting via the internal network connections 38 to the spine switches 36 (e.g., two internal network connections 38 from each of the leaf switches 34 to each of the spine switches 36). Sixteen of the network connections of each of the LEAF SWITCHES 10 and 11 are connected to the up-tier network connections 42 and sixteen of the network connections of each of the LEAF SWITCHES 10 and 11 are connected to the spine switches 36 via the internal network connections 38 (e.g., 5 or 6 connections 38 to each of the spine switches 36). Therefore, twelve leaf switches 34 and three spine switches 36 may provide switching functionality for a box with of around 288 external network port connections. This can be compared with other boxes which may need 27 switches to provide a high radix switch box of 288 external network port connections.

In the above example, the north-south (e.g., up-tier/down-tier) oversubscription of a leaf switch is 6/26 which is better than the required ratio of ⅛.

It should also be noted that ten leaf switches 34 provide 260 down-tier network connections 40, while only 256 down-tier network connections 40 are needed for connecting to the pods 28 in the above example.

The connectivity between the leaf switches 34 and the pods 28 may be defined by any suitable combination of groups of pods 28. In one example, the following table may be used to connect the leaf switches 34 with the pods 28.

| Leaf switch number | Pod numbers connected to the leaf switch |
| --- | --- |
| 0 | 0-25 |
| 1 | 6-31 |
| 2 | 12-31, 0-5 |
| 3 | 18-31, 0-11 |
| 4 | 24-31, 0-17 |
| 5 | 30-31, 0-23 |
| 6 | 4-29 |
| 7 | 10-31, 0-3 |
| 8 | 16-31, 0-9 |
| 9 | 26-31, 0-15 |

It can be observed from the above table that each pod 28 has eight connections to the switch 22 with each connection being to a different leaf switch 34. All the leaf switches 34 have connectivity to twenty-six pods 28 except LEAF SWITCH 9 that has connectivity to twenty-two pods 28. In this case, LEAF SWITCH 9 may include ten uplink connections 38 to the spine switches 36 as LEAF SWITCH 9 has only twenty-two connection to the pods 28. While the above table meets the requirements, it has a drawback that the pods 28 are not uniformly connected across the relevant leaf switches 34 so that one of the leaf switches 34 has much less network connections than the other leaf switches 34. In some embodiments, an improved connectivity may include connecting the pods 28 more uniformly over the relevant leaf switches 34 such as six leaf switches 34 being connected to twenty-six pods 28, and four leaf switches 34 being connected to twenty-five pods 28.

In some embodiments, the number of internal network connections 38 from each leaf switch 34 (to the spine switches 36) is greater than, or equal to, the number of pods 28 that are not connected to that leaf switch 34, thereby ensuring that the east-west oversubscription is greater than, or equal to, one. In some embodiments, the ratio of internal network connections 38 of each leaf switch 34 to the external network port connections 48 of that leaf switch 34 is greater than the required north-south oversubscription ratio (in the above example, the north-south oversubscription of a leaf switch is ⁶⁄₂₆ which is better than the required ratio of ⅛). In some embodiments, the connectivity of the leaf switches 34 is as balanced as possible, in that the number of pods 28 connected to each leaf switch 34 (which is used for pod connection) is the same or approximately the same.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A computer network system, comprising:
   at least one lower tier of lower switches, ones of the lower switches being connected to lower end point devices;
   at least one upper tier of upper switches; and
   a middle tier of middle switches connected down-tier to ones of the lower switches and up-tier to ones of the upper switches, one of the middle switches comprising a clos topology arrangement of leaf switches and spine switches, wherein:
   the leaf switches are connected via K internal network connections to the spine switches, each of the leaf switches being connected to each of the spine switches;
   the leaf switches are connected via N down-tier network connections to ones of the lower switches and via M up-tier network connections to ones of the upper switches;
   there are more of the N down-tier network connections than there are of the M up-tier network connections; and
   there are less of the K internal network connections between the leaf switches and the spine switches than there are of the N network connection plus the M network connections.

2. The system according to claim 1, wherein the at least one lower tier includes a plurality of pods, each pod comprising at least one of the lower switches, respective different groups of the pods being connected via respective groups of the N down-tier network connections to respective ones of the leaf switches.

3. The system according to claim 2, wherein a first one of the leaf switches includes only Q network connections, less than half of the Q network connections being connected to the spine switches, more than half of the Q network connections being connected to different ones of the pods selected from a first one of the groups of the pods.

4. The system according to claim 3, wherein a second one of the leaf switches includes only R network connections, less than half of the R network connections being connected to the spine switches, more than half of the R network connections being connected to different ones of the pods selected from a second one of the groups of the pods.

5. The system according to claim 2, wherein a first one of the leaf switches including only Q network connections, less than 25% of the Q network connections being connected to spine switches, more than 75% of the Q network connections being connected to different ones of the pods.

6. The system according to claim 2, wherein the pods include two layers of the lower switches, a bottom layer of the lower switches being connected to the lower endpoint device, a top layer of the lower switches connected to the bottom layer and to ones of the middle switches.

7. The system according to claim 2, wherein the pods are disposed in a data center.

8. The system according to claim 1, wherein at least one of the leaf switches is connected via P respective ones of the M up-tier network connections to P respective one of the upper switches and via P respective ones of the K internal connections to the spine switches.

9. The system according to claim 1, wherein:
   the one middle switch includes an enclosure box comprising external network port connections;
   the leaf and spine switches are disposed in the enclosure box; and
   the K internal network connections are disposed in the enclosure box.

10. The system according to claim 1, wherein a quantity of the leaf switches is more than double a quantity of the spine switches.

11. A network switch device, comprising:
    an enclosure box;
    external network port connections disposed on the enclosure box, and configured to receive network cables from devices external to the network switch; and
    a clos topology arrangement of respective leaf switches and respective spine switches disposed in the enclosure box, wherein:
    the leaf switches are connected via K internal network connections to the spine switches,
    the K internal network connections are disposed in the enclosure box;
    each of the leaf switches is connected via at least one of the K internal network connections to each of the spine switches; and
    there are less of the K internal network connections between the leaf switches and the spine switches than there are of the external network port connections.

12. The device according to claim 11, wherein one of the leaf switches includes only R network connections, less than half of the R network connections being connected to the spine switches via ones of the K internal network connections, more than half of the R network connections being connected to the external network port connections.

13. The device according to claim 11, wherein one of the leaf switches includes only R network connections, less than 25% of the R network connections being connected to the spine switches via ones of the K internal network connections, more than 75% of the R network connections being connected to the external network port connections.

14. The device according to claim 11, wherein a quantity of the leaf switches is more than double a quantity of the spine switches.

15. A network switch device, comprising:
a clos topology arrangement of leaf switches and spine switches; and
K internal network connections connecting the leaf switches to the spine switches, each of the leaf switches being connected to each of the spine switches, wherein:
the leaf switches are connected via N down-tier network connections to lower switches in at least one lower tier, which is connected to lower end point devices, and via M up-tier network connections to ones of the upper switches in at least one upper tier;
there are more of the N down-tier network connections than there are of the M up-tier network connections; and
there are less of the K internal network connections between the leaf switches and the spine switches than there are of the N network connection plus the M network connections.

16. The device according to claim 15, wherein the at least one lower tier includes a plurality of pods, each pod comprising at least one of the lower switches, respective different groups of the pods being connected via respective groups of the N down-tier network connections to respective ones of the leaf switches.

17. The device according to claim 16, wherein a first one of the leaf switches includes only Q network connections, less than half of the Q network connections being connected to the spine switches, more than half of the Q network connections being connected to different ones of the pods selected from a first one of the groups of the pods.

18. The device according to claim 17, wherein a second one of the leaf switches includes only R network connections, less than half of the R network connections being connected to the spine switches, more than half of the R network connections being connected to different ones of the pods selected from a second one of the groups of the pods.

19. The device according to claim 16, wherein a first one of the leaf switches including only Q network connections, less than 25% of the Q network connections being connected to spine switches, more than 75% of the Q network connections being connected to different ones of the pods.

20. The device according to claim 15, wherein a quantity of the leaf switches is more than double a quantity of the spine switches.

* * * * *